(12) United States Patent
Dueck

(10) Patent No.: US 6,637,602 B2
(45) Date of Patent: Oct. 28, 2003

(54) DISPLAY RACK FOR STORING AND DISPLAYING ARTICLES

(76) Inventor: Raymond Dueck, Box 700, Arborg, Manitoba (CA), R0C 0A0

( * ) Notice: Subject to any disclaimer, the term of this patent is extended or adjusted under 35 U.S.C. 154(b) by 0 days.

(21) Appl. No.: 10/058,059

(22) Filed: Jan. 29, 2002

(65) Prior Publication Data

US 2003/0141263 A1 Jul. 31, 2003

(51) Int. Cl.[7] .................................................. A07E 7/00
(52) U.S. Cl. ........................................................ 211/17
(58) Field of Search ............................. 211/17, 18, 19, 211/20, 21, 22

(56) References Cited

U.S. PATENT DOCUMENTS

| | | | | |
|---|---|---|---|---|
| 636,324 A | * | 11/1899 | Ehrenberg | 211/17 |
| 639,991 A | * | 12/1899 | Jewell | 211/19 |
| 650,663 A | * | 5/1900 | Whitcher | 211/18 |
| 4,555,029 A | * | 11/1985 | Fiol | 211/189 |
| 5,449,074 A | * | 9/1995 | Paulson et al. | 211/22 |
| 5,845,788 A | * | 12/1998 | Robolin | 211/1.51 |

* cited by examiner

Primary Examiner—Alvin Chin-Shue
Assistant Examiner—Sarah Purol
(74) Attorney, Agent, or Firm—Adrian D. Battison; Michael R. Williams; Ryan W. Dupuis

(57) ABSTRACT

A combination of a bicycle and a display rack therefor, the bicycle has a frame and a plurality of wheels on the frame. The rack having a frame, a mount portion of the frame arranged to be coupled to a ceiling of a building, a linkage having a hanger such that the bicycle can be coupled to the hanger and wherein the linkage is moveable between a first raised position for display and a second lowered position for providing access to the hanger and a cylinder and piston within the mounting portion for retracting the linkage from the second position to the first position.

20 Claims, 6 Drawing Sheets

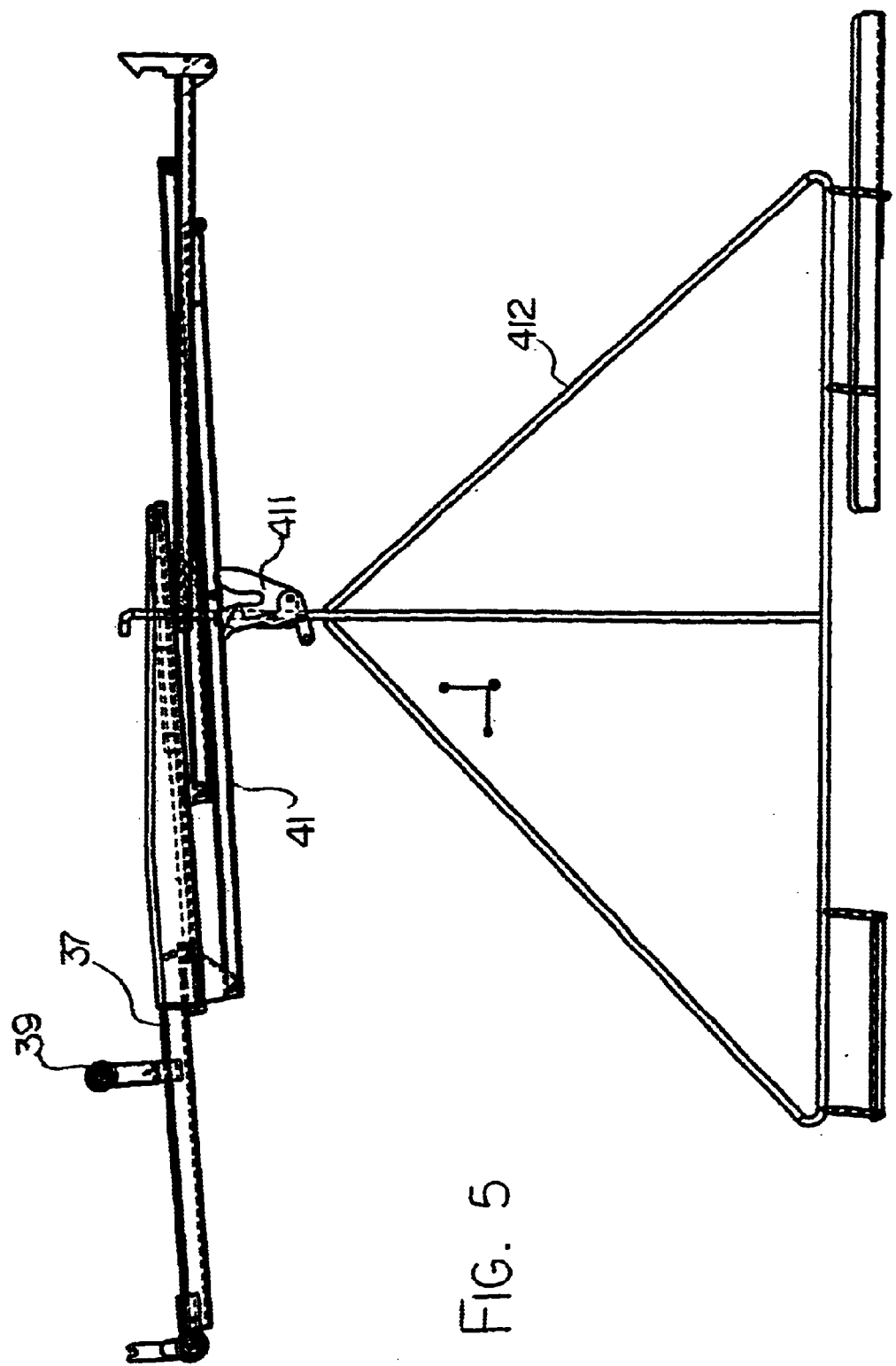

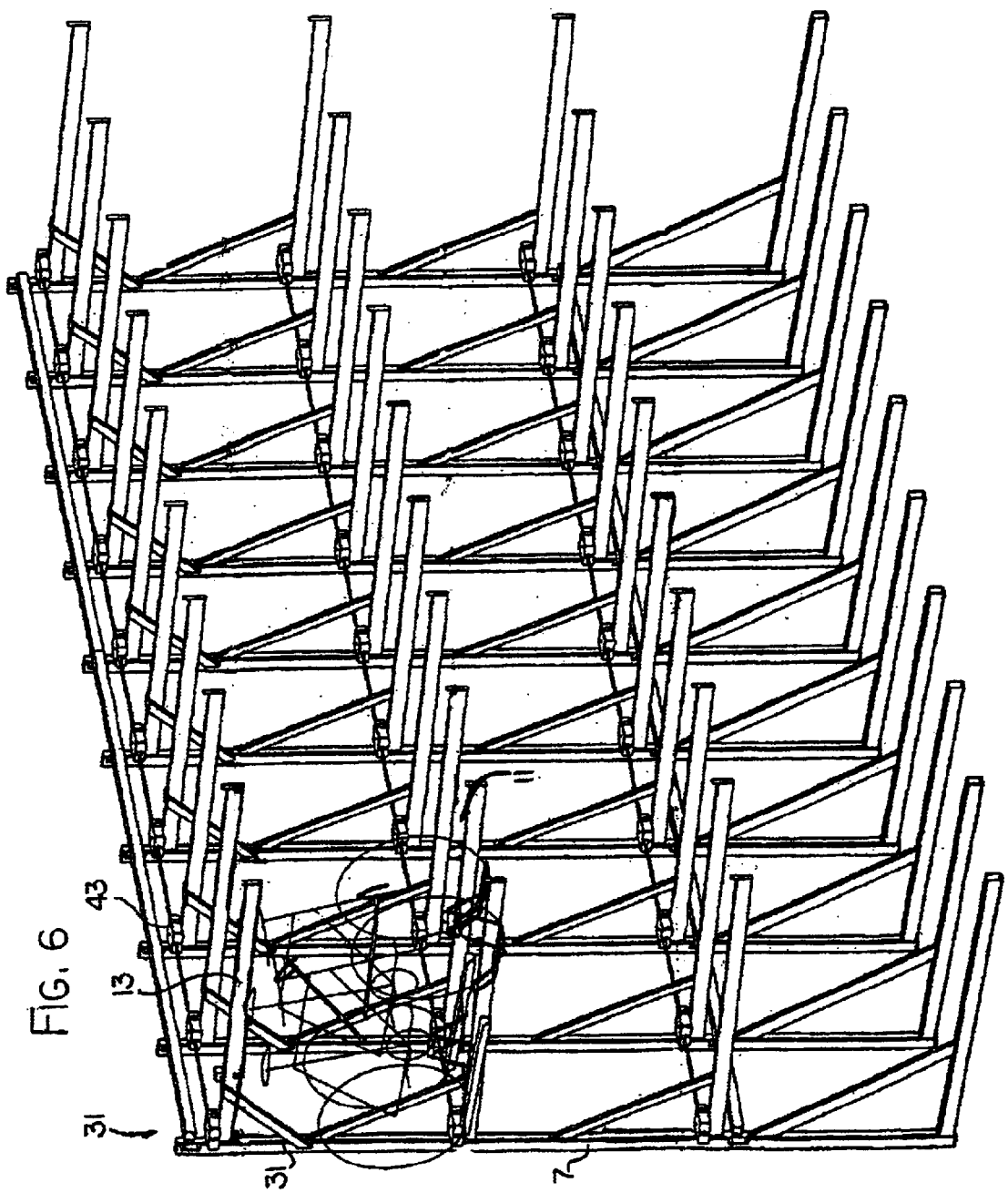

DISPLAY RACK FOR STORING AND DISPLAYING ARTICLES

FIELD OF THE INVENTION

The present invention relates to a display rack which is primarily designed for bicycles but which may be used for other similar articles in a retail area.

BACKGROUND

Commonly, in the retail business, floor space is necessary for providing an acceptable display of item for sale. In order to provide substantial floor space the items must be displayed not only in an attractive orderly manner but they also have to maintain a safe customer environment as well as providing accessibility to the items. A substantially effective way to organise the items is to provide shelving in which the items are placed. Shelving allows the items to be stored and displayed off the floor thereby providing the necessary floor space needed. Placing items on shelves may be found to be unsafe and inefficient since obtaining the items from the shelves could prove to be unsafe and difficult since an employee or such must raise his or her self to the level of the shelf to take down or put up the item(s).

Another way of maximising floor space is to raise the item(s) from the ground and hanging them from racks or hooks. Again the can prove to be difficult and unsafe in that, for the same reasons stated above, the employee has to reach up to the rack or hook to remove or replace the item(s).

Items can also be hung from the ceiling or walls but again could provide an unsafe environment and could prove to be difficult to access the item(s).

In view of the above examples, providing floor space in a retail outlet for bicycles is equally or perhaps more difficult. A first problem which may be caused by bicycles in the outlet is that there is generally a large number of bicycles on display since there are many different models, sizes and types of bicycles available. Also bicycles can be hard to display because bicycles need a stand in order to be in an upright or acceptable displaying position. Putting bicycles on shelves can be proved to be very difficult and unsafe because of the above reasons which provide bicycles with instability.

SUMMARY

It is one object of the present invention to provide an improved storage and display system which is primarily but not exclusively designed for bicycles and allows storage in a small space with the bicycles being displayed in a common small display area.

According to the present invention there is provided a display apparatus for displaying a plurality of articles comprising:

a frame;

a plurality of moveable display hangers each arranged to support at least one article;

each display hanger being suspended from a respective support arrangement coupled to the frame on which the respective display hanger can be moved generally horizontally between a first storage position and a second display position;

the display hangers being arranged in at least two rows each having at least one moveable hanger with one upper row being located above the other lower row such that when the hangers are located in the storage position the upper row is located directly above the lower row;

the support arrangements being arranged such that each of the hangers is movable from the storage position to the display position in front of the storage position while other hangers remain in the storage position;

and the support arrangements of the hangers of the upper row being arranged such that each of the hangers of the upper row is movable vertically downwardly to the display position in front of the lower row while other hangers remain in the storage position.

Preferably there is provided a locking mechanism arranged to secure the hanger in position when in the first storage position.

Preferably each moveable hanger is arranged to support a pair of bicycles.

Preferably the moveable hanger is mounted on a rail providing movement in a forwards and rearwards direction.

Preferably each moveable hanger is suspended so that it can be moved in a side to side swaying movement.

Preferably there is at least three rows of moveable hangers and the top row is movable vertically.

Preferably a top row has a linkage supporting the hanger such that articles can be coupled to the hanger and wherein the linkage is moveable between a first raised position for display and a second lowered position for providing access to the hanger.

Preferably each hanger carries a pair of bicycles side by side and is arranged such that one is offset slightly forwardly and upwardly of the other.

Preferably the support arrangement includes a horizontal rail on which the hanged can be moved forwardly and rearwardly and wherein the rail can be raised and lowered to provide said vertical movement.

Preferably there are provided two sections each containing a plurality of rows and wherein the two sections are area arranged face to face so as to use a common display area therebetween.

Preferably there is provided an additional storage area above the sections in which the articles are supported on horizontally movable supports and can be raised to the storage position and lowered into the display position between the two sections.

According to a third aspect of the invention there is provided a display apparatus for displaying a plurality of articles comprising:

a frame;

a plurality of moveable display hangers arranged side by side in a row each arranged to support at least one article;

each display hanger being suspended from a respective support rail coupled to the frame on which the respective display hanger can be moved generally horizontally along the rail between a first storage position and a second display position;

and wherein each moveable hanger is suspended so that it can be moved in a side to side swaying movement.

According to a third aspect of the invention there is provided a display apparatus for displaying a plurality of articles comprising:

a plurality of moveable display hangers each arranged to support at least one article;

each display hanger being suspended from a respective support arrangement on which the respective display hanger can be moved generally horizontally between a first storage position and a second display position;

the display hangers being arranged in two sections each containing at least two rows each having at least one moveable hanger with one upper row being located above the other lower row such that when the hangers are located in the storage position the upper row is located directly above the lower row;

the support arrangements being arranged such that each of the hangers is movable from the storage position to the display position in front of the storage position while other hangers remain in the storage position;

wherein the two sections are arranged face to face so as to use a common display area therebetween;

and wherein there is provided an additional storage area above the sections in which the articles are supported on horizontally movable supports and can be raised to the storage position and lowered into the display position between the two sections.

BRIEF DESCRIPTION OF THE DRAWINGS

In the accompanying drawings, which illustrate an exemplary embodiment of the present invention:

FIG. 5 is a side elevational view of a second embodiment of the cradle.

FIG. 6 is an isometric view of the section shown in FIG. 2.

DETAILED DESCRIPTION

Figure 1:
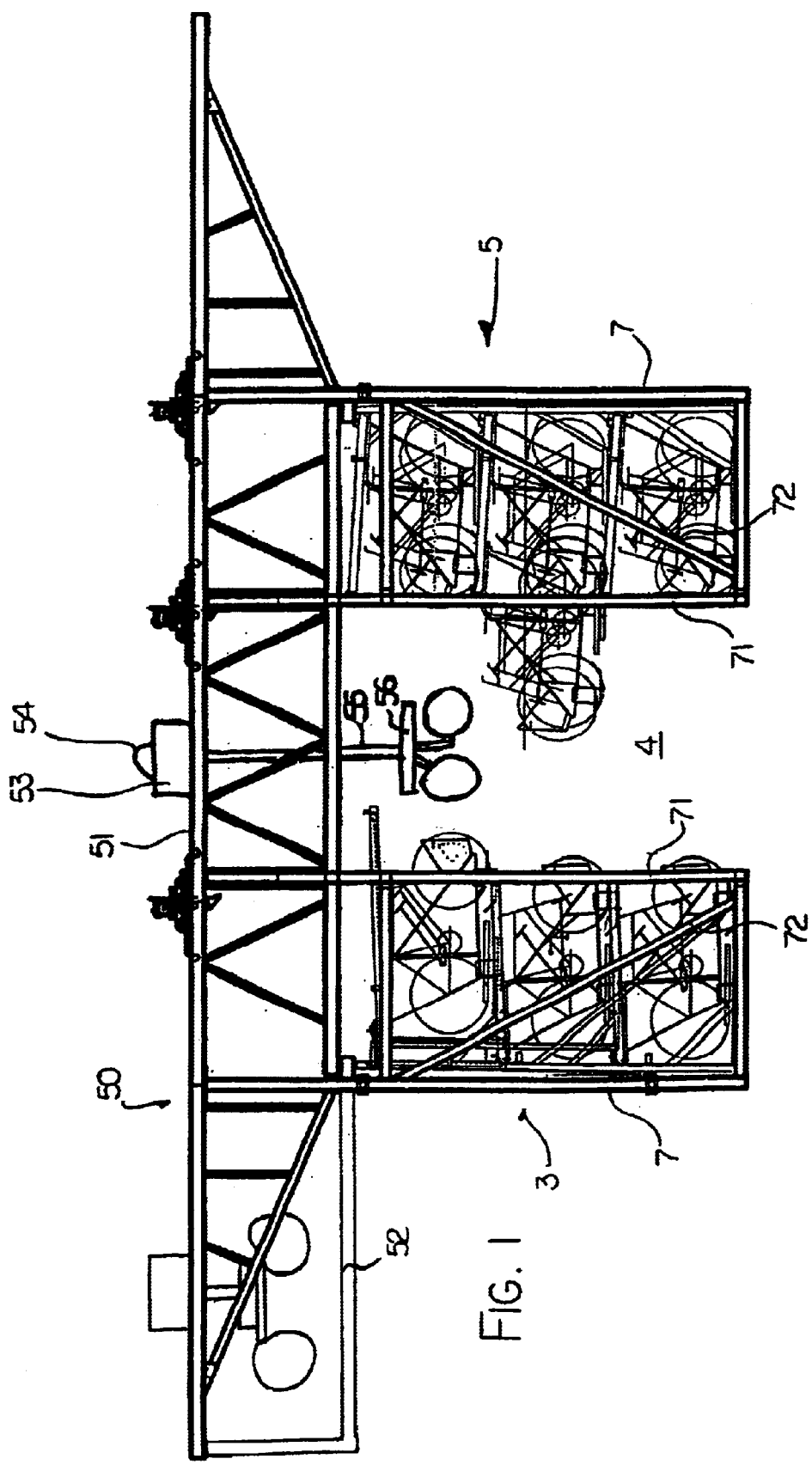
FIG. 1 is a side elevational view of an embodiment according to the present invention.

Referring to the accompanying drawings, there is illustrated a bicycle display 1 having a first section, indicated by reference numeral 3, and a second section 5. Each section 3, 5 can be utilised with the entire bicycle display 1 as shown or can be set up individually for different applications.

The first section 3, as shown in FIGS. 2 to 6, has an upright frame 7 which supports a plurality of moveable hangers 9. The hangers are positioned side by side in rows 11. As illustrated, there are three rows positioned one on top of the other on the frame, but the number of rows can be increased to four or decreased to two if desirable depending upon the space available the and the size of the articles to be displayed.

Figure 4:
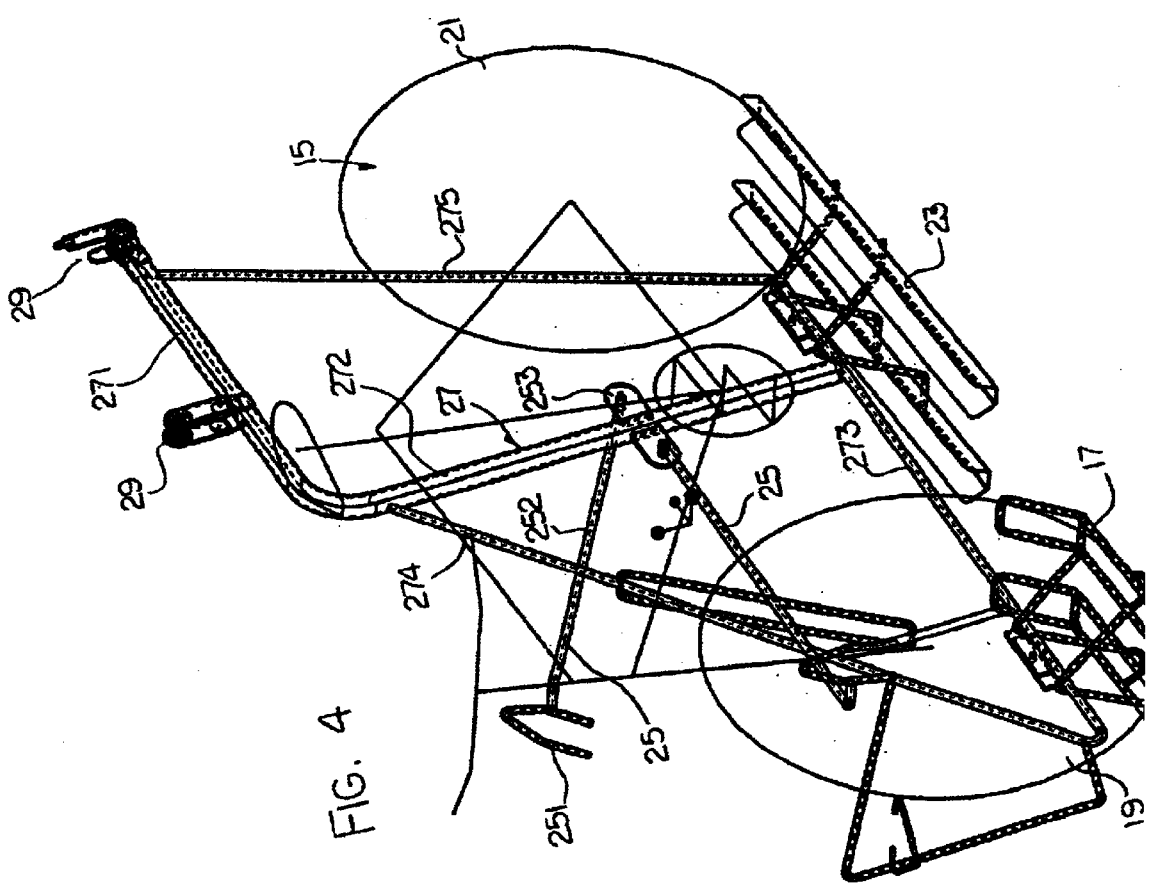
FIG. 4 is an isometric view of a hanger defining a cradle for two bicycles.

Each hanger is moveable on a respective support arrangement defined by a rail 13 such that each hanger can be moved away from a storage position at the frame to a display position I front of the frame and in front of the remaining hangers in the storage position for access to the hanger. Each hanger is arranged to support either a single bicycle or more preferably two bicycles 15 as is illustrated. The hanger supports the bicycle with wheel holsters 17 which are arranged to cradle a front wheel 19 of a bicycle, as illustrated in FIG. 4. The rear wheel 21 is supported by an elongate cradle 23 having a length arranged such that different sized bicycles can be supported thereon. A wheel support lever 25 is pivotally mounted to a frame 27 of the hanger to engage the front wheel for holding the wheel and thus the bicycle in position on the holster 17. The bike mounts on the hanger are located on respective sides of the hanger frame and are staggered such that the holsters, support lever and cradle are all slightly offset so that one bike is mounted thereon slightly in front of and slightly above the other.

The frame 27 includes a horizontal top bar 271, vertical main support 272, a horizontal bottom bar 273 and braces 274 and 275. The holsters 17 and cradles 23 are suspended by support bars passing across the bottom bar 273. The levers 25 include an inverted U-shaped holder 251 for the wheel attached to a rearwardly extending arm 252 pivoted on a bracket 253 attached to the vertical bar 272.

The frame has guide wheels 29 on the top bar 271 thereof which are arranged to fit within the rail for movement therein. The rail is arranged such that the hanger can sway to allow side to side movement of the hanger. The side to side movement can be used by manual manipulation of the frame as the frame is manually pulled forwardly to release the bikes on the hangers from engagement with bikes on other hangers such that the hangers can be relatively close to each other.

A lowering arrangement 31 utilized by the third or higher rows is arranged to provide a user with access to the top row or rows in that the third row is moved downwardly to the height of the second row when pulled manually forwardly to the display position. The lowering arrangement carries the rail 13 on a pair of vertical posts 311 and 312 which guides the rail 13 and its respective hanger downwards such that the top hanger is lowered to be accessed by a user.

Figure 2:
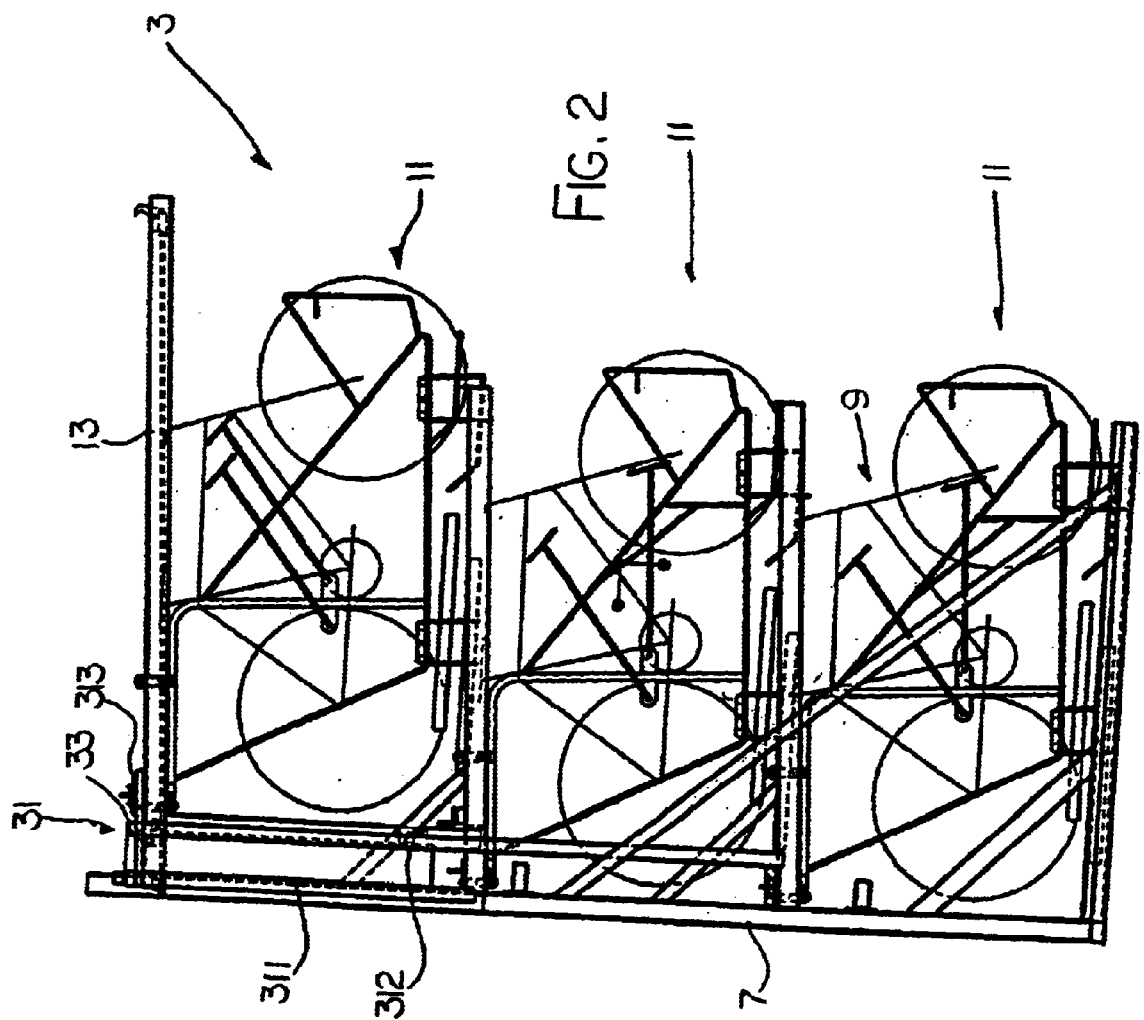
FIG. 2 is a side elevational view of on an enlarged scale of one section of the embodiment of FIG. 1.
Figure 3:
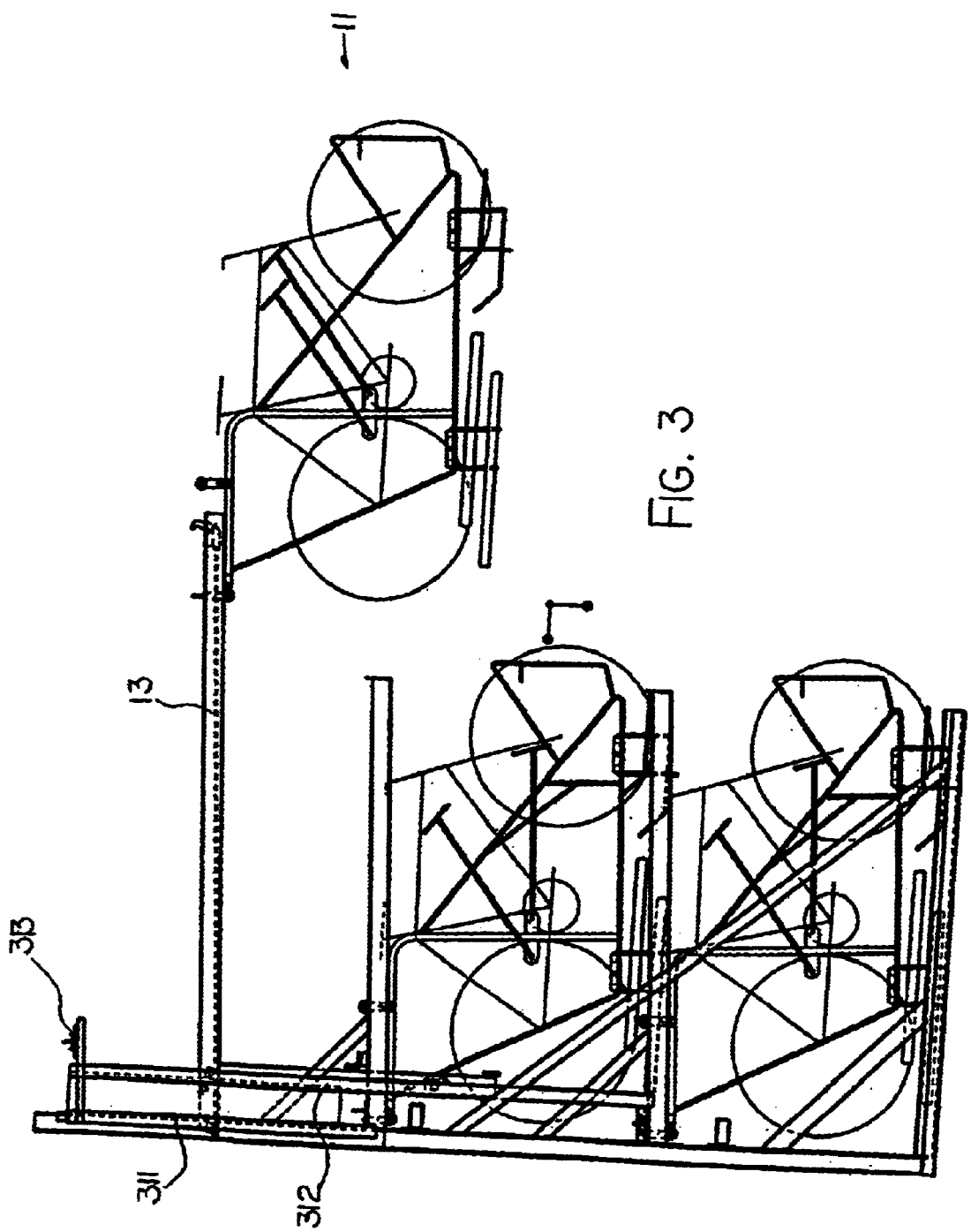
FIG. 3 is a side elevational view of the section illustrated in FIG. 2 with a hanger of the top row being partly lowered.

A first embodiment of the lowering arrangement, as illustrated in FIGS. 2, 3 and 4, is arranged such that the rail 13 lowers with the hanger. An inner end 33 of the rail 13 is mounted within the vertical post 311 and a second vertical support post 312 is mounted in front of the vertical post 311 arranged to provide horizontal support for the rail 13. The rail 13 slides along the posts and is raised and lowered manually or electrically using a winch 313.

A second embodiment of the lowering arrangement, as illustrated in FIG. 5, comprises a mount beam 37 which has a guide wheel 39 for riding on the rail 13. In this arrangement, the rail 13 remains at a constant height and the movement of the hanger is effected by a linkage between the rail and the hanger. The arrangement has a linkage 41 which is moveable upwards and downwards. The linkage is a four bar linkage which is retracted by a cylinder and piston, not shown, which controls the movement of the linkage as well as providing assistance in raising and lowering. The linkage described above is described in U.S. Pat. No. 6,302,278 (Dueck), the disclosure of which is incorporated herein by reference. At the bottom of the linkage 41 is provided a hook 411 to which is attached a hanging frame 412 with the same holsters and cradles as previously described for supporting the bicycle or bicycles.

Each cradle is connected by a latching mechanism 43 which prohibits movement of a cradle if another cradle is pulled out. This specifically is important for safety reasons such that the cradles in the upper rows can only be pulled out one at a time which provides balance to the first section. The weight of the bicycles is not overly heavy but with larger built sections, holding a large number of bicycles, the weight of more than one cradle at a time may cause the section to tilt forwards.

As illustrated in FIG. 1 there are two sections 3 and 5 which are arranged face to face that is so that each co-operates with a central display position 4 between the two sections 3 and 5 which is dimensioned so that it can receive for display the bicycles from one row of one of the sections. Thus the area 4 between the sections is dimensioned so as to just receive the length of the bicycle together with additional space in front and rear of the bicycle to allow a sales person to show the features of the bicycle while the customer can also view the bicycle.

A bicycle can therefore be displayed from any one of the three rows of each of the two sections. The bottom row displays the bicycles at floor level while the top two rows display the bicycle at a raised elevation approximately equal to the height of the second row.

In addition, the sections can perform a part of a further display system which utilizes the space above the sections to store yet further bicycles. Thus the top of the sections 3 and 5 supports a frame structure generally indicated at 50 defining a pair of parallel raised main rails 51 supported above a floor section 52. The main beams are carried on braces 53. The structure of the frame is shown only schematically since the frame structure will be apparent to one skilled in the art. The pair of main rails 51 are spaced across the width of the sections 3 and 5 so as to provide two guide rails each for receiving a respective end of a transverse support beam 53 which extends across the structure and includes a winch 54 for raising and lowering cables 55. The cables are spaced apart across the width of the structure and carry a suspended frame 56 which has a plurality of attachment holders by which a series of bicycles are attached to the frame 56. The frame 56 can thus be raised and lowered on the cables 55 by operation of the electric winch 54.

As shown there are five support beams 53 and co-operating frames 56 and these can be moved along the beams 51 so that each in turn can be moved to a position above the display area 4. While the frame 56 are in the retracted or raised position, the support beam and the associated frame can be moved to a position adjacent one end of the rails 51 into a storage area above the floor structure 52. The beams 53 are movable along the rails 51 on suitable guides (not shown) and are moved by motors provided on the beams 53 which drive the beams to the required position either in the storage location or above the display area 4.

The frames of the sections thus provide posts 7 which support the superstructure for the additional above floor storage and additional posts 71 can be provided at the front of the sections together with braces 72 which render the structure more stable.

The frames 56 are rectangular horizontal elements. The details of the mounting arrangement of the bicycles on the frames 56 by which the saddle attaches to a rear support and the handle bars attach to a front support are well known to one skilled in the art and therefore do not need to be shown.

While one embodiment of the present invention has been described in the foregoing, it is to be understood that other embodiments are possible within the scope of the invention. The invention is to be considered limited solely by the scope of the appended claims.

What is claimed is:

1. A display apparatus for displaying a plurality of articles comprising:
   a frame;
   a plurality of moveable display hangers each arranged to support at least one article;
   each display hanger being suspended from a respective support arrangement coupled to the frame on which the respective display hanger can be moved generally horizontally forwardly between a first storage position and a second display position;
   the display hangers being arranged in at least two rows with each row having a plurality of moveable hangers and with one upper row being located above the other lower row such that, when the hangers of the upper row are located in the storage position of the upper row and the hangers of the lower row are located in the storage position of the lower row, the hangers of the upper row are located directly above the hangers of the lower row;
   the support arrangements of the hangers of the lower row being arranged such that each of the hangers of the lower row is movable generally horizontal forwardly from the storage position In the lower row to the display position in the lower row in front of the storage position while other hangers of the upper and lower rows remain stationary in the storage positions;
   the support arrangements of the hangers of the upper row being arranged such that each of the hangers of the upper row is movable generally horizontally forwardly from the storage position in the upper row to the display position in front of the storage position while other hangers of the upper and lower rows remain stationary in the storage positions;
   and the support arrangements of the hangers of the upper row being arranged such that each of the hangers of the upper row is movable vertically downwardly to the display position in the lower row in front of the hangers in the storage position of the lower row while other hangers remain stationary in the storage positions.

2. The apparatus according to claim 1 wherein each support arrangement includes a locking mechanism arranged to secure the hanger in position when in the first storage position.

3. The apparatus according to claim 1 wherein each moveable hanger is arranged to support a pair of bicycles.

4. The apparatus according to claim 1 wherein each support arrangement is arranged such that the moveable hanger is mounted on a rail providing movement in a forwards and rearwards direction.

5. The apparatus according to claim 1 wherein each support arrangement is arranged such that the moveable hanger is suspended so that it can be moved in a side to side swaying movement.

6. The apparatus according to claim 1 wherein there are at least three rows of moveable hangers and the top row comprises said upper row which is movable vertically.

7. The apparatus according to claim 6 wherein the support arrangements of the top row each have a linkage supporting the hanger such that articles can be coupled to the hanger and wherein the linkage is moveable between a first raised position for display and a second lowered position for providing access to the hanger.

8. The apparatus according to claim 1 wherein each hanger carries a pair of bicycles side by side and is arranged such that one is offset slightly forwardly and upwardly of the other.

9. The apparatus according to claim 1 wherein each support arrangement of said upper row includes a horizontal rail on which the hanger can be moved forwardly and rearwardly and wherein the rail can be raised and lowered to provide said vertical movement.

10. The apparatus according to claim 1 wherein there are provided two sections each containing a plurality of rows and wherein the two sections are arranged face to face so as to use a common display area therebetween.

11. The apparatus according to claim 10 wherein there is provided an additional storage area above the sections in which the articles are supported on horizontally movable supports and can be raised to the storage position and lowered into the display position between the two sections.

12. A display apparatus for displaying a plurality of articles comprising:

a frame;

a plurality of moveable display hangers arranged side by side in a row each arranged to support at least one article;

each display hanger being suspended from a respective support rail coupled to the frame on which the respective display hanger can be moved generally horizontally along the rail between a first storage position and a second display position;

and wherein each moveable hanger is suspended so that it can be moved in a side to side swaying movement.

13. The apparatus according to claim 12 wherein there is provided for each hanger a locking mechanism arranged to secure the hanger in position when in the first storage position.

14. The apparatus according to claim 12 wherein each moveable hanger is arranged to support a pair of bicycles.

15. The apparatus according to claim 12 wherein each hanger carries a pair of bicycles side by side and is arranged such that one is offset slightly forwardly and upwardly of the other.

16. A display apparatus for displaying a plurality of articles comprising:

a first dismay section;

a plurality of moveable first display hangers on the first display section each arranged to support at least one article;

each first display hanger being suspended from a respective support arrangement on which the respective first display hanger can be moved generally horizontally between a first storage position and a second display position;

the first display hangers being arranged in at least two rows each row having at least one hanger and with one upper row being located above the other lower row such that when the hangers of the upper row and the lower row are located in the storage position the hangers of the upper row are located directly above the hangers of the lower row;

the support arrangements being arranged such that each of the hangers is movable from the storage position to the display position in front of the storage position while other hangers remain in the storage position;

a second display section;

a plurality of moveable second display hangers on the second display section each arranged to support at least one article;

each second display hanger being suspended from a respective support arrangement on which the respective second display hanger can be moved generally horizontally between a first storage position and a second display position;

the second display hangers being arranged in at least two rows each row having at least one hanger and with one upper row being located above the other lower row such that when the hangers of the upper row and the lower row are located in the storage position the hangers of the upper row is are located directly above the hangers of the lower row;

the support arrangements being arranged such that each of the hangers is movable from the storage position to the display position in front of the storage position while other hangers remain in the storage position;

wherein the first and second sections are arranged face to face so as to use a common display area therebetween;

and wherein there is provided an additional storage area above the first and second sections in which the articles are supported on horizontally movable supports and can be raised to the storage position and lowered into the display area between the first and second sections.

17. The apparatus according to claim 16 wherein each moveable hanger is arranged to support a pair of bicycles.

18. The apparatus according to claim 16 wherein each moveable hanger is mounted on a rail providing movement In a forwards and rearwards direction.

19. The apparatus according to claim 18 wherein each moveable hanger is suspended on the rail so that it can be moved in a side to side swaying movement.

20. The apparatus according to claim 16 wherein each hanger carries a pair of bicycles side by side and is arranged such that one is offset slightly forwardly and upwardly of the other.

* * * * *